United States Patent [19]

Lowe

[11] 4,268,396
[45] May 19, 1981

[54] OIL RECOVERY APPARATUS AND METHOD

[75] Inventor: John G. Lowe, Pequannock, N.J.

[73] Assignee: Lowe Engineering Company, Lincoln Park, N.J.

[21] Appl. No.: 165,741

[22] Filed: Jul. 3, 1980

Related U.S. Application Data

[63] Continuation-in-part of Ser. No. 59,595, Jul. 23, 1979, abandoned.

[51] Int. Cl.³ .................. B01D 15/02; B01D 25/38
[52] U.S. Cl. .................................. 210/670; 210/693; 210/742; 210/776; 210/784; 210/923; 210/532.1
[58] Field of Search ............... 210/670, 693, 742, 776, 210/784, 532 R, 923

[56] References Cited

U.S. PATENT DOCUMENTS

| | | | |
|---|---|---|---|
| 1,379,176 | 5/1921 | Foster | 210/923 |
| 1,860,819 | 5/1932 | Schamberger | 210/923 |
| 2,117,273 | 5/1938 | Brown | 210/923 |
| 3,338,414 | 8/1967 | Lefke et al. | 210/923 |
| 3,358,838 | 12/1967 | Kosar et al. | 210/923 |
| 3,426,902 | 2/1969 | Kilbert et al. | 210/923 |
| 3,612,277 | 10/1971 | Van Staron et al. | 210/923 |
| 3,690,464 | 6/1970 | Heinicke | 210/242 S |
| 3,706,379 | 12/1972 | Erlich | 210/169 |
| 3,905,902 | 9/1975 | Hoeberg | 210/242 S |
| 4,021,344 | 5/1977 | Webb | 210/923 |
| 4,051,024 | 9/1977 | Lowe et al. | 210/670 |
| 4,172,036 | 10/1979 | Morris | 210/923 |

*Primary Examiner*—Theodore A. Granger
*Attorney, Agent, or Firm*—Ralph R. Roberts

[57] ABSTRACT

An oil recovery apparatus and method, particularly for removing oil and grease from the discharge of dishwashing machines or the like, provides a small size assembly employing the same principle as in U.S. Pat. No. 4,051,024. This apparatus and method employs single rotating discs of plastic or plastic coated material and each disk has a pair of scraper blades arranged to scrape opposite sides of the rotating blade. Exterior of the container for the oil recovery apparatus is at least one filter basket adapted to receive the flow into the strainer container of large particles of food and other waste such as cigarette butts and the like. Each filter is disposed for the ready cleaning of accumulated matter from the basket. There is shown plural filters, valve controls, auxiliary heating and disc support means to be more fully described.

48 Claims, 24 Drawing Figures

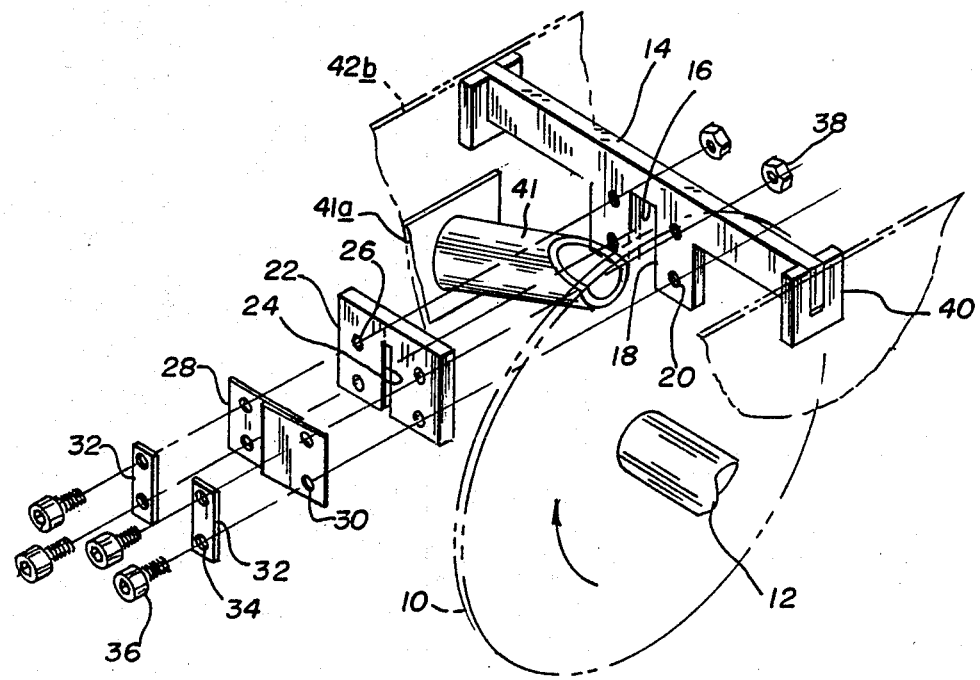
FIG.1
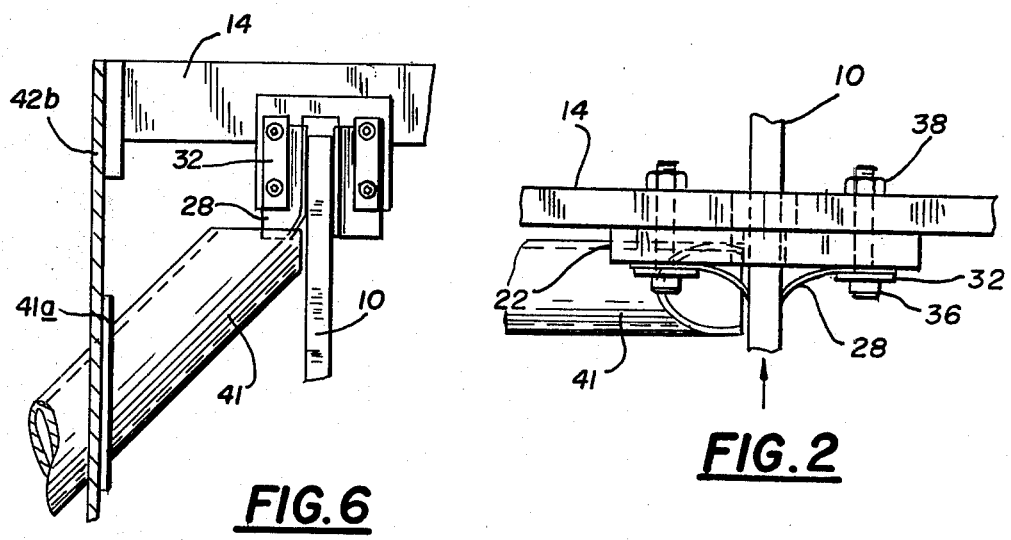
FIG.6
FIG.2

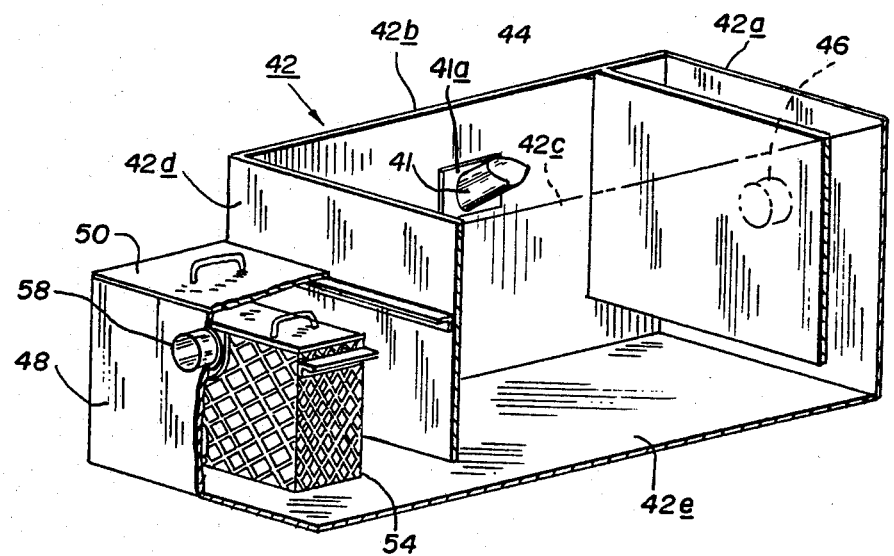
FIG. 3
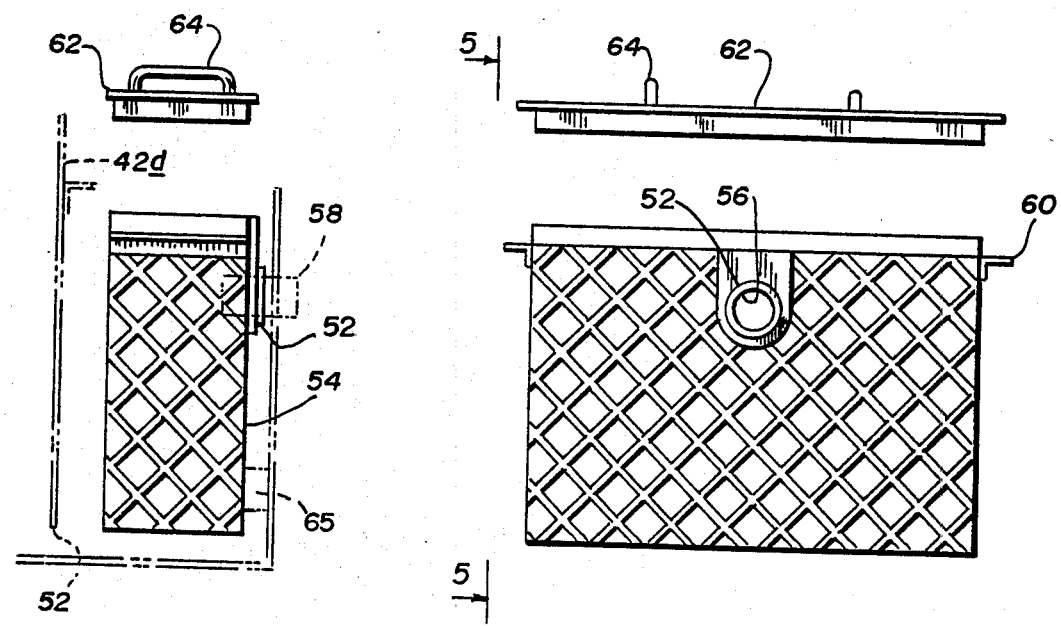
FIG. 5
FIG. 4

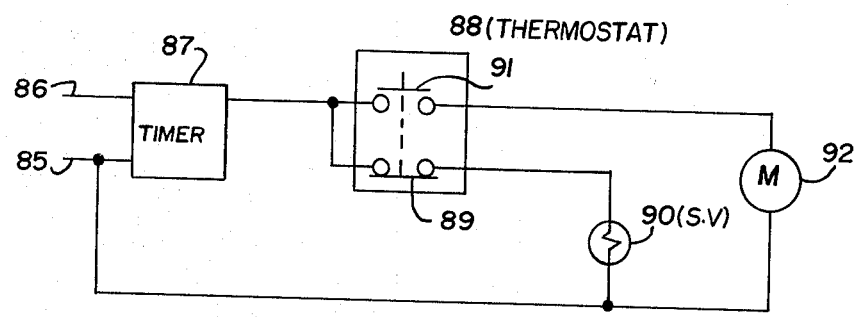
FIG. 12
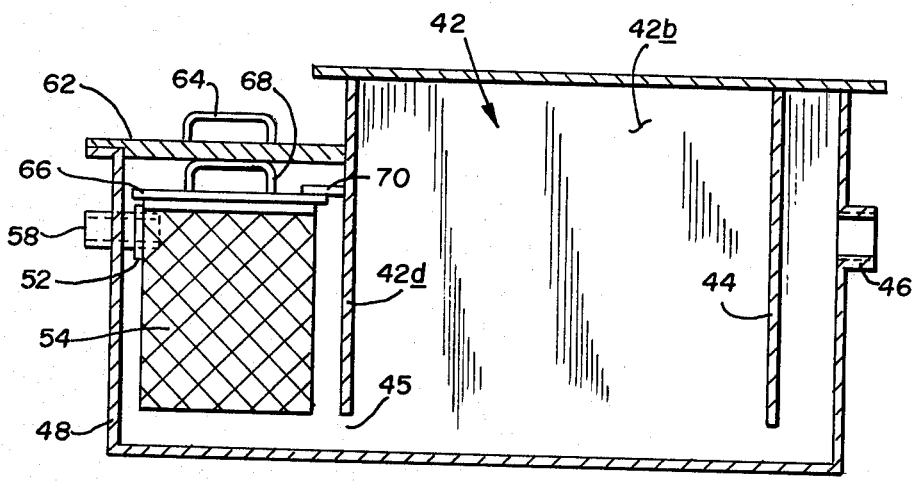
FIG. 7
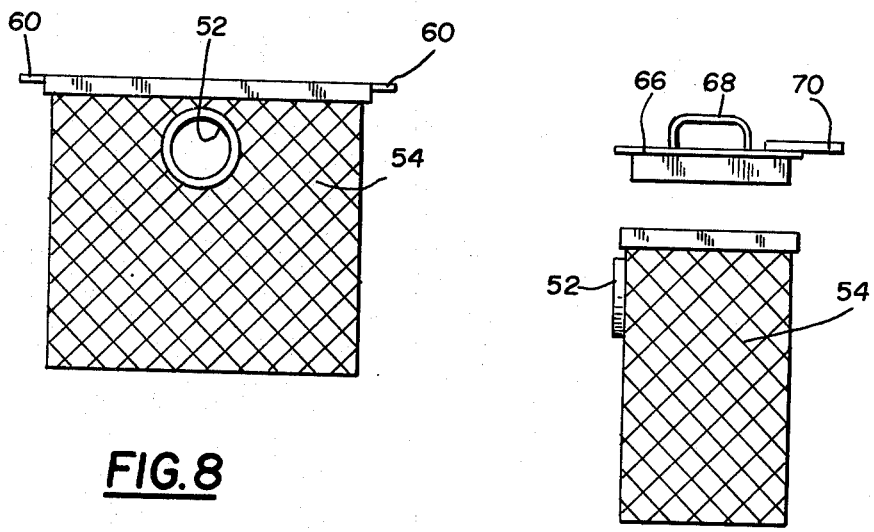
FIG. 8
FIG. 9

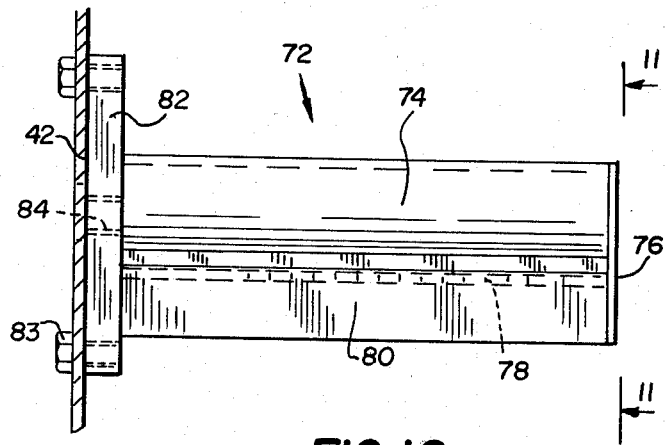
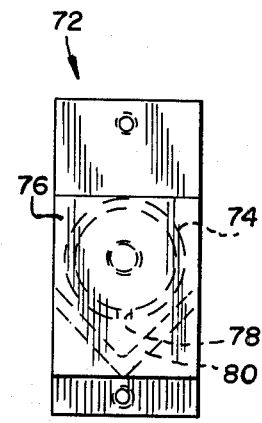
FIG.10  FIG.11
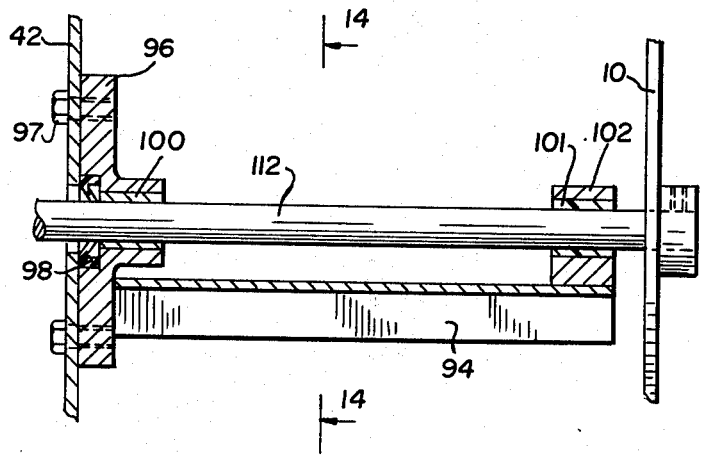
FIG.13
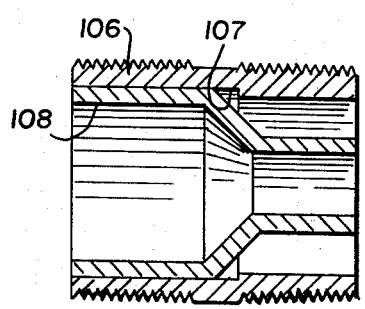
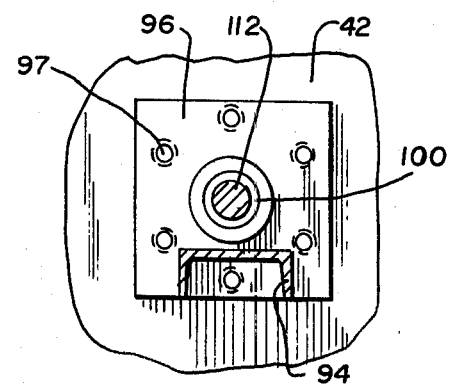
FIG. 15  FIG.14

OIL RECOVERY APPARATUS AND METHOD

This is a continuation-in-part of my U.S. Patent application entitled, "OIL RECOVERY APPARATUS AND METHOD" filed July 23, 1979 and having Ser. No. 59,595, now abandoned.

CROSS REFERENCE TO U.S. PAT. NO. 4,051,024

To the extent applicable the U.S. Pat. No. 4,051,024 as issued on Sept. 27, 1977 and assigned to Lowe Engineering Company, Lincoln Park, N.J. (07035), who is also the owner of this application, is incorporated by reference into this application.

BACKGROUND OF THE INVENTION

Oil recovery systems are not new and apparatus for the separation of oil from water is well known and is the subject of extensive and continuing development. In U.S. Pat. No. 4,051,024, there is shown a highly effective and simple apparatus and method for separating oil as it floats on the surface of water and the like. This apparatus and others, which are known to the applicant, are adapted for the removal from and/or separation of large patches of oil and/or grease in a large body or volume of water. The present invention is directed toward dishwasher apparatus and in particular for use in restaurants and fast food outlets where grease and/or cooking oil is present. The washing of dishes and cooking utensils used by these restaurants leave much to be desired in the disposal of the residual water. Often the dishes are dumped into the washer without removal of all, and in some cases without any removal of food scraps and/or cigarette butts. The discharge material from the dishwashing apparatus is often condemned by sanitary inspectors or like agency officials. The oil recovery apparatus and method of this invention provides a small unit particularly adapted for use with dishwashing apparatus.

SUMMARY OF THE INVENTION

This invention may be summarized, at least in part, with reference to its objects.

It is an object of this invention to provide, and it does provide, an oil recovery apparatus in which a single rotating disk is partly immersed in fluid containing grease and/or oil and water. This disk, during its rotation, is brought in way of scraper blades disposed on each side of the rotating blade. The grease and/or oil picked up by this blade is fed by a conductor to an accumulator. The disk motor and scrpaer blades as a unit are readily removed from the recovery apparatus.

It is an object of this invention to provide, and it does provide, a method for the ready removal of grease and oil from the dish water and for the ready replacement of the recovery mechanism including the disk, scrapers and motor for repair and/or inspection.

The apparatus of this invention is much like the apparatus as shown in U.S. Pat. No. 4,051,024, above referenced, but is particularly adapted for use with restaurant dishwashing apparatus for the separation and removal of grease and/or oil from the dishes and/or utensils washed and cleaned for use in the preparation of food. A single disk of plastic, small scraper assemblies of plastic and a motor drive is made removable and replaceable by merely lifting out the existing unit and as a unit replacing with another of like size.

The oil recovery apparatus, to be hereinafter more fully described, includes a single rotatable plastic disk which is driven at a selected slow speed. A removable bridge member stradles this rotating disk and in localized areas scrapes the sides of the rotating disk to remove the attracted grease and/or oil. The scraper portions are two similar extents of flexible plastic which are bent into arcuate configuration and into and toward the sides of the disk.

The recovery container or receptacle is formed with interior baffles into which the influent flows. This flow is under a baffle and into the center portion of the container in which and from which the oil and/or grease to be recovered is removed by the rotating disk. The received influent from the dishwashing apparatus is fed to and through an exterior wall of a receiving chamber. In this chamber is carried a strainer or filter into which the influent flows. This filter is a meshed basket which allows only small particles and contaminated water to flow therefrom. From this meshed basket the grease and/or oil bearing water is fed to the recovery container from which the grease and/or oil is recovered by the rotating disk and scraper. Clean or clear water is removed from the other end of this chamber after grease and/or oil recovery.

This recovery apparatus contemplates only one disk in each main compartment but said recovery apparatus may employ a sequency of compartments. In addition, there is shown and described a manifold for receiving the discharge material from a dishwasher and from this manifold said material is distributed to strainer baskets arranged to be selectively removed for cleaning while other baskets are used. Heating apparatus is provided for bringing the temperature of the central portion of the container to a desired level and bring the grease and/or oil therein to a fluidity sufficient for the rotating disk to attract and remove the grease and/or oil. Although two scraping blades are used with each disk, the discharge is usually from only one side of the disk. The use of two scraper blades in contact with the sides of the disk is to equalize the tracking forces and wear of this disk.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of an oil recovery apparatus as adopted for use for removing grease and/or oil from dish water and showing a preferred means for straining debris from the influent flow of contaminated water. This specific embodiment has been chosen for the purposes of illustration and description as shown in the accompanying drawings wherein:

BRIEF DESCRIPTION OF THE DRAWINGS

FIG. 1 represents an expanded isometric view showing a rotary disk and a method of construction and assembling of a pair of scraper blades used therewith, this separating apparatus adapted for ready lifting and replacement in a container;

FIG. 2 represents a fragmentary top view showing the assembly of a pair of scraper blades in position on the rotating disk;

FIG. 3 represents a fragmentary, partly diagrammatic, isometric view of a typical container construction and showing a strainer disposed to receive and retain food and large debris particles while straining the contaminated water prior to its flow into the separating tank;

FIG. 4 represents an enlarged view of a typical strainer construction of the container as disposed and used in the tank of FIG. 3;

FIG. 5 represents a side view of the strainer as taken on the line 5—5 of FIG. 4 and looking in the direction of the arrows;

FIG. 6 represents a partly diagrammatic and fragmentary end view showing a tube for conducting the oil as collected by the rotating blade and feeding this collected material by the tube to and through the sidewall of the container to collection means;

FIG. 7 represents a side view, partly diagrammatic, and showing a strainer support means in combination with a compartment assembly;

FIG. 8 represents a strainer basket as in FIG. 7, this view showing the strainer basket in a front view and in a slightly enlarged scale;

FIG. 9 represents a side view in a partly expanded condition and showing the strainer and removable cover of FIG. 7;

FIG. 10 represents a side view, partly diagrammatic, and showing a hot water distributing system for a grease recovery compartment in which the rotaing disk is operated;

FIG. 11 represents an end view of the hot water distributing system of FIG. 10, this view taken on the line 11—11 thereof and looking in the direction of the arrows;

FIG. 12 represents a schematic circuit control of the hot water distributing system of FIG. 10;

FIG. 13 represents a side view of a support for a shaft on which is mounted a rotating disk;

FIG. 14 represents a sectional view of the support for a shaft as in FIG. 13, this view taken on the line 14—14 thereof and looking in the direction of the arrows;

FIG. 15 represents a sectional view, partly diagrammatic, of a flow reducer for flow in a pipe, this flow reducer used with the flow from the dishwasher;

In the following description and in the claims various details are identified by specific names for convenience. These names are intended to be generic in their application. Corresponding reference characters refer to like members throughout the several figures of the drawings.

Figure 16:
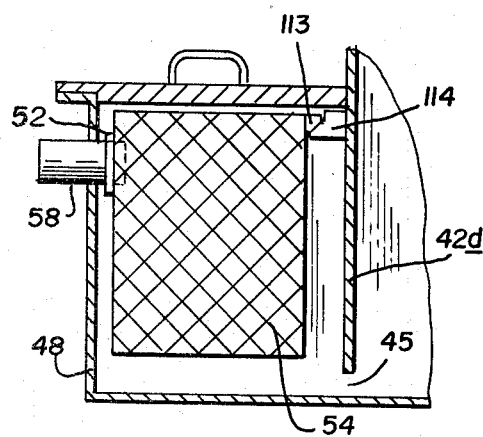
FIG. 16 represents a side view of an arrangement for support of a strainer basket.
Figure 20:
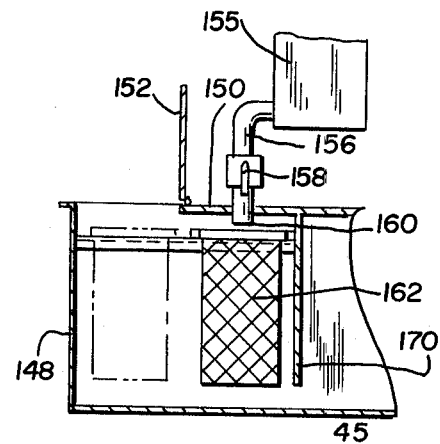
FIG. 20 represents a partly diagrammatic side view showing an arrangemrnt for three strainer baskets with selective valve control for removal of one or more strainer baskets during operation.

The drawings accompanying and forming part of this specification disclose details of construction for the purpose of explanation but structural details may be modified without departure from the concept and principles of the invention and the invention may be incorporated in other structural forms than shown.

DETAILED DESCRIPTION OF THE DISK AND SCRAPER OF FIG. 1

Referring now to the drawings and the detailed description thereof, there is depicted in FIGS. 1 and 2, a preferred construction of a rotating disk 10 as carried by and rotated by and with a shaft 12 driven by a motor not shown. The rotation of this shaft is at a very slow speed such as ten r.p.m. or less. As noted in the above identified U.S. Pat. No. 4,051,024 the rotation of this disk 10 is at a comparatively slow speed so that the turbulence in the water is kept at a minimum so that the oil can float to and be attracted and carried by the sides of the rotating disk 10. A bridge member 14 is preferably made with a cutout 16 to carry ears 18 disposed downwardly on each side of the rotating disk 10. Through holes 20 are depicted as four in number and are formed in the ears 18 for the removable attachment of scraper blades to be hereinafter more fully disclosed.

As shown, there is a spacer block 22 which as depicted has a narrower slot 24 than cutout 16. The width of this slot 24 is only slightly wider than the thickness of the rotating disk 10. Also formed in spacer block 22 are four through holes 26 which are spaced and sized to correspond to the through holes 20 formed in the bridge member 14. Two pieces of plastic, Nylon (TM duPont) strip, preferably one-sixteenth of an inch in thickness, form and provide scraper blades 28. These scraper blades 28 are of like configuration and are formed with holes 30 therein. These holes 30 are the same size and spacing as through holes 26 and 20. Retainers 32 may be of thin metal or plastic and have holes 34 formed therein so as to mate and match with holes 30, 26 and 20. Cap screws 36 pass through the aligned holes and are secured in place by means of nuts 38 to retain the scraper blades 28 to the bridge member 14 as seen in FIG. 2. U-shaped members 40 are placed or secured to the inside, near the top of the container 42 and are positioned so as to carry the scraper blades 28 in position on rotating disk 10.

USE AND OPERATION

For the purpose of this description it is contemplated that the bridge member 14 and the assembled scraper blades 28 can be readily removed from the container 42 for replacement or repair. For the purpose of assembly it is contemplated that spacer block 22 is aligned so that the through holes 20 and 26 are in substantial coincidence after which the plastic scraper blades 28 are positioned with the retainers 32 on the outside of the blades. The cap screws 36 are passed through the several holes and are secured by means of nuts 38 to the bridge member 14. In a tightened condition on the bridge member 14 the attached and positioned scraper blades 28 are then brought into position on the disk. Scraper blades 28 are of like length and are positioned on rotating disk 10 as it is rotated toward the bridge member 14. The scraper blades 28 engage the sides of the rotating disk 10 to remove the grease and/or oil attracted thereto. The scraper blades 28 are designed to engage the sides of the rotating disk to cause it to track straight with no side pressure. This is very important in providing a readily upward removal of this bridge member for repair or adjustment.

CONTAINER AND STRAINER OF FIGS. 3, 4 AND 5

Referring next to FIGS. 3, 4 and 5, there is depicted a filter or strainer used with the container 42. As shown, a container 42 is preferably of a rectangular configuration and has a baffle 44 spaced a short distance of the rear wall 42a. Side wall portions 42b, of the container assembly, carry the baffle 44. The baffle 44 is spaced a short distance, such as one and a half inches, from the bottom of the container identified as 42c. A front wall of this container, identified as 42d, is disposed to carry an inlet, not shown, or may have a passage 45 thereunder for the influent flow of water as mixed with grease and/or oil.

In the rear wall and as shown in dashed outline, is a discharge 46 which carries the clarified or clean water after the grease and/or oil have been removed therefrom. A baffle similar to baffle 44 may be placed near the front wall 42d of the container so that the influent material can be directed into the central portion of the container 42. Reduced turbulance in the container is provided by these baffles so that the oil recovery until as shown in FIGS. 1 and 2 may be utilized. As the disk 10 is rotated it removes the grease and/or oil. Following the removal of the grease and/or oil, which is accomplished with a minimum of turbulance in the water, said water is then discharged from the container.

Attached to and made a part of front wall 42d is a filter container 48 which, as shown, is a rectangular configuration attached to the front wall of the container 42d. A cover 50 is removably carried on the top of the filter container 48 so that the inside of this container may be examined and cleaned. In front wall 42d there may be provided an inlet 52 in and through which the contaminated water flows. This inlet 52 may be a round opening in the wall or the wall may stop short of the bottom and provide a passageway 45. When a forward baffle is used and placed adjacent to the front wall 42d it merely insures that turbulance in the central portion of the container 42 is reduced. Within the fitler container 48 is the strainer 54 which is preferably of a mesh construction so as to confine the larger debris from the discharge of the diswashing apparatus. This strainer is disposed to allow the influent water to pass freely and carry with it the grease and/or oil. In a forward sidewall of the strainer 54 there is provided an inlet 56 which is a slide or slip fit for an inlet tube 58 secured to the outer wall of the filter container 48. This inlet tube 58 is secured to the wall of the filter container 48 and also to the influent flow from the dishwasher. When debris, such as cigarette butts, large particles of food and the like, have substantially filled the strainer 54, the cover 50 of the container is removed and strainer 54 is slid towards the wall 42d to disengage the strainer from the inlet tube 58. By means of handles or grip portions 60, this mesh filter or strainer is lifted from the filter container 48. Cover 62 is now removed by handles 64 which are utilized to lift the cover 62 from the strainer 54 to clean debris which has accumulated in the strainer. After this accumulation has been removed the strainer is replaced in the filter container 48. A sharp tap of the upside-down strainer 54 usually removes most or all of the accomulated debris and reinstallation of the same strainer 54 into the filter container 48 is readily accomplished with the strainer being moved in place on the inlet tube 58. Dirty water from the dishwasher is then allowed to flow to the interior of the strainer 54 and then into the container 42. This strainer 54 may be assisted in its positioning in the compartment by one or more spacers 65 which engage and/or are secured to the front of the strainer 54 as in FIG. 5. Other support arrangements are described in later presented FIGS.

USE AND OPERATION

It is to be noted that the use of the strainer 54 permits a dishwasher to be connected directly to the oil and/or grease recovery unit of this invention. It is highly desirable that the grease and/or oil carried by the water to the container 42 be strained as much as possible so that the cover for the container 42, which is not shown, may be infrequently removed. The scraper blades 28, used to remove the grease and/or oil, wear faster when required to remove and carry the debris from the water in the container. This strainer 54 therefore reduces wear of said scraper blades 28. Several means of carrying the oil and/or grease to the outer portion or outside of the container 42 are contemplated, among which is having a tube 41 adapted to carry the oil and/or grease from the scraper blades 28 to the sides of the container for removal of the grease and/or oil into one or two receptacles. It is also to be noted that the disk may be arranged so that the grease may be carried by a single conductor to and through baffle 44 and the rear wall 42a. This tube or conduit may be of conventional construction.

Preferably the container 42 is made of a clad sheet metal or it can of stainless steel. The baffles are arranged and carried in guides within the container. The oil recovery unit employs only a single rotating disk 10. The filter container 48 is also contemplated to be made of metal with the removable cover 50 also of a metal so that abuse can be readily tolerated. The rotation of the disk 10 may be toward the front or toward the rear. The shaft 12 may be rotated by a gear motor of low horsepower and r.p.m.'s. Preferably the strainer 54 is made of metal mesh and is substantial enough to be self-supporting to carry the cover member 62. The strainer 54 is substantially rigid enough for removal and abusive treatment during removal of the debris trapped therein.

It is to be noted that the present equipment provides and anticipates the use of this grease and/or oil separating apparatus for use with a dishwashing apparatus as utilized by restaurants and fast food chains. The outflow from such dishwashing apparatus includes not only the food particles and other debris as discarded from the plates of the patrons, but also includes a certain amount of grease and/or oil normally found on the plates of the dining patrons. The dishwasher is also used to clean the utensiles used by the cooks in preparation of food. Many, if not most of these utensils, such as fry pans and the like, have accumulated grease and/or oil coated on their surfaces. In particular, butter, margarine and the like, are often found in the dishwasher and in the water used therewith, often requiring the container 42 to be heated to at least bring the influent water to a temperature of above one hundred degrees fahrenheit. Such a warmed condition may and does cause the grease and/or oil to be liquified to the extent that is can float and be attracted to the rotating disk 10. Preferably the disk is of a high density polyethylene and the short scraper blades are preferably made of Nylon (TM duPont) of about one-sixteenth of an inch in thickness. These plates and disks are readily replacable at low cost. The support frame is removable from the container 42 for replacement of the scraper blades 28 which are disposed to engage the rotating disk 10 to apply an equal pressure on each side of the rotating disk 10.

It is to be noted that the bridge member 14, absent the scraper block 22, may provide for the attachment and support of the scraper blades 28. This permits spacer block 22 to be omitted when and while these plastic scraper blades 28 are mounted in position for placement as in FIG. 2. The scraper blades 28 may be as thin as one thirty-second of an inch in thickness when the scraper blades are of sufficient stiffness. The material and stiffness of these blades determines the thickness of the scraper.

It is also to be noted that the containers may be made of fabricated or molded plastic as long as these containers are sufficiently rigid and rugged enough to withstand abuse and developed pressures. The strainer 54 may be made of molded or fabricated plastic mesh or perforated material. The strainer 54 is contemplated to be self-supporting and to additionally carry a cover such as that shown in FIGS. 4 and 5. The general principle of construction and operation has been shown in and by the drawings and detailed description of the apparatus and method for grease and/or oil removal. Changes to accommodate the particular use of the apparatus is therefore contemplated. Included in the additions is a timer that may be selectively programmed to provide selected time periods of operation. Such a timer may be electronically by and with the operation of the dishwasher since the recovery apparatus may be required to operate only for a time, such as one hour, which is usually sufficient to remove the grease and/or oil from the fluid in the container 42.

The strainer 54 may be supported or elevated from the bottom of the filter container 48. This elevating apparatus may be a metal bar or series of bars to provide an additional discharge area from the strainer. The inflow to container 42 through the inlet 52 may be at any desired height below cover 50. As reduced to practice, this opening is very near the bottom of container 42 and a forward baffle-like member very similar or identical to baffle 44 is mounted in container 42. This baffle insures that the influent fluid flows by this baffle with little turbulance in the central container portion in which the removal apparatus is disposed.

EMBODIMENT OF FIG. 6

In FIG. 6 is depicted a comprehensive view of the disposition and use of the discharge tube 41. This tube is conventionally a metal tube that is secured to a flange member 41a secured to a side of the container 42. This tube is disposed to provide a gravity discharge for grease and/or oil and as shown is disposed at about forty-five degrees to the side wall 42b. The top or right end of tube 41 is cut at an angle which brings the top end about parallel to the bridge member 14. The inner end of this tube is also cut at an angle so that the inner end is very close to the rotating disk 10.

In operation, the scraper blades 28 are curved to engage the sides of the disk 10. As seen in FIG. 6 and in the view of FIG. 2 the blade 28 at its lower end is curled and enters the upper and inner end of discharge tube 41. The scraped material from the rotating disk 10 is discharged to and through this tube 41. As seen in FIG. 6, the disk 10, although scraped by two blades 28, preferably has only one discharge tube 41 and thus discharges from only one side of the disk. The shaft 12 is driven by a motor means and so as a practical matter only one discharge tube is used. The removal capacity of this apparatus is usually greater than required and the apparatus is usually used only a few hours a day. The bridge member 14 is vertically movable into and from the container 42.

EMBODIMENT OF FIGS. 7, 8 AND 9

FIG. 7 includes the main container 42 and the filter container 48. A slot 45 below the separating wall 42d allows the contaminated water flowing from the strainer 54 to pass under the bottom portion of the container wall and flow to a desired level within the main container 42. Shown in this side view is the filter container cover 62 with handles 64 and below this is provided a filter cover 66 with handles 68 thereon. On the cover 66 is provided a rearward stop member or members 70 adapted to engage the wall 42d and after the cover 66 is in place to limit the rearward movement of the strainer 54.

In FIG. 8 is shown the filter of FIG. 7 having a formed inlet 52 which is slidable on inlet tube 58. The top cover 66 not only has handles 68 formed thereon but also rearward stop members 70.

In FIG. 9 it is to be noted that the filter 54 is provided with lifting handles 60 as seen in FIG. 4. These handles (angle iron) provide grasping means for lifting the strainer 54 from within the container 48. As seen in FIG. 7, the front wall 42d has a slot thereunder identified as 45. No forward baffle is used in this arrangement since the separating wall 42d provides the required and desired baffle arrangement.

HOT WATER HEATER OF FIGS. 10 AND 11

In FIGS. 10 and 11 there is depicted a hot water manifold which is adapted for admitting hot water to the container 42 to bring the fluid in said container to a desired temperature. At this temperature the grease and/or oil which normally floats on the top of this section is liquified sufficiently whereat the rotating disk 10 can lift up the grease and/or oil sufficiently to bring it in way of the scraper blades 28. This hot water manifold includes a pipe 74 which is closed at one end by end member 76. A series of downwardly directed apertures 78 are formed in this pipe 74 and below these apertures is the reflector which is an angle 80. The left end of this manifold pipe 74 and the angle deflector 80 are attached by cap screws 83 to side wall portion 43b of the container 42. This end member 82 has a pipe thread 84 formed therein and therethrough for the entrance into this pipe 74 of hot water externally supplied. A gasket or other sealing means is provided so that a leak does not occur between the end member 82 and the side wall 42b of the container.

This manifold is adapted to flow hot water into the compartment 42 and to bring the temperature of the fluid to an elevation sufficient to bring the grease and/or oil to sufficient fluidity so that the rotating disk will be effective. The downwardly directed apertures 78 carry this influent pressurized flow of hot water toward the angle deflector 80. The flow of hot water is then directed upwardly but not with sufficient intensity to affect the level of contaminated fluid in the compartment 42.

CIRCUIT DIAGRAM OF FIG. 12

In FIG. 12 is a diagram of the hot water manifold control of FIGS. 10 and 11 which includes conventional electrical power (110 volts A.C.) which is brought through conductors 85 and 86 to a timer 87. The output from this timer is fed to a thermostat 88 which has a double throw switch therein. As shown, the thermostat 88 is "closed" or "on" with contact side 89. This switch closing causes a solenoid valve 90 to be opened and hot water enters into the manifold pipe 74. When a desired temperature is achieved in the compartment 42 (i.e. ninety degrees fahrenheit) the thermostat 88 is actuated and the solenoid valve 90 is closed. Switch contact 91 is now closed and the solenoid valve is shut. Motor 92 is now started and turns connected disk 10 a desired rate. The timer 87 prevents actuation of the oil recovery unit for a longer time duration than anticipated. The timer can be reset, of course, may time it is desired and the apparatus will operate. If the temperature from the dishwasher is greater than the temperature required to operate the apparatus and remove the grease and/or oil from the water, then the solenoid valve 90 is closed. The thermostat is non-functional and the motor 92 continues to operate until the temperature drops to below a selected limit whereat the rotation of motor 92 ceases. The heating of the grease and/or oil and the residue in the container 42 is desired when the contaminated flow enters the container 42 and the water therein is at less than the desired temperature and the grease and/or oil is at less than a desired fluidic condition.

The circuit of FIG. 12 shows an electrical control of the apparatus. This is not to preclude the use of pneumatics or hydraulics. The simple circuit and control is adapted for operating the grease and/or oil recovery apparatus for a selected time interval. A repeat of this time period, of course, is available. The solenoid valve 90 is adapted to be opened to a flow of influent hot water when the thermostat 88 indicates that the container 42 and its contents are at a temperature which is lower than the selected temperature. Motor 92 does not begin to turn disk 10 until the selected temperature has been reached and the solenoid actuated valve 90 has closed.

DRIVE SUPPORT FOR A ROTATING DISK AS IN FIGS. 13 AND 14

Referring now to FIGS. 13 and 14, it is to be noted that a shaft 112 rotates a disk 10 on its inboard or right end. As viewed, shaft 112 is carried by an aligned support which includes a channel 94. This channel is secured to an end plate 96 which is removably mounted to the wall 42b by means of cap screws 97. Shaft seal 98 prevents fluid from passing along shaft 112 to the outside of the container 42. The end plate 96 is also mounted to the side wall 42b with a gasket or other sealing means to prevent a leakage or seepage of fluid to the outside of the container. Bearings 100 and 101 support this shaft 112 during its rotation with the bearing 101 carried by a pedestal block 102 at the inner end by channel 94. Such a support carries the shaft 112 so that unwanted bending of the shaft 112 and the mounting to wall 42b of the shaft and motor does not cause a small bind or leak. The apparatus shown in FIGS. 13 and 14 provides a positive and independent alignment of the bearings 100 and 101 to carry the shaft 112 without regard to a small distortion which is possible in wall 42b and the supporting of the disk 10.

The apparatus of FIGS. 13 and 14 provides a shaft support that insures that the shaft will be supported without bending or binding of the shaft. As provided in this embodiment, the shaft 112 is supported so that any bending or wave in the side 42b of the container does not affect the operation of the shaft and the rotated disk 10. This support insures that the disk and shaft operate as a unit no matter the extent of inwardly extension of the shaft 112 into the container. The positive support of the disk 10 enables the positioning of the bridge member 14 in a positive orientation.

FLOW REDUCER AS IN FIG. 15

In FIG. 15 there is shown a flow reducer in which the normal output from a dishwasher is reduced so as to limit the influent stream rate into the strainer basket and the disk container. As depicted, a coupling 106 has an internal bore 107 which receives and retains a copper reducer 108. As depicted, the flow in the direction of the arrow reduces the output to about one-fourth. This reduced amount is generally provided at the output of the dishwashing apparatus. This reduces the flow into the strainer basket 54 and to the container 42 so that the flow does not provide undue turbulence.

It is to be noted that this flow reducer may be used to limit the flow in any and all portions of the apparatus. This reducer enables the pressurized flow to be limited to manageable proportions and to avoid turbulence. Turbulence is to be particularly avoided in the container or containers in which the rotating disk 10 is mounted since turbulence reduces the efficiency of lifting the grease and/or oil.

STRAINER BASKET RETAINER AS IN FIGS. 16 AND 17

Referring next to FIG. 16, it is to be noted that the strainer basket 54 may have a rearwardly extending projection portion 113 which engages stop 114 secured to the wall 42d. In use, the strainer 54 is slid onto inlet tube 58 secured to strainer container 48. This strainer, after mounting on the tube 58, is slide rearwardly until projection 113 engages and is stopped by stop 114. This stop prevents unwanted rearwardly movement. The shaped projection 113 enables the strainer 54 to be easily lifted from the container 48 for cleaning. The effluent from strainer 54 preferably flows under wall 42b through slot 45.

Figure 17:
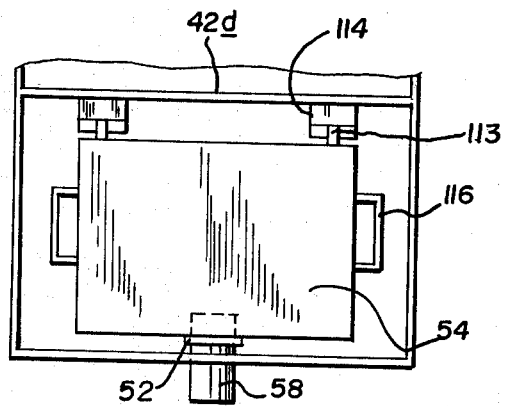
FIG. 17 represents a plan view of the support arrangement of the strainer basket of FIG. 16.

As seen in FIG. 17, strainer basket 54 is equipped with handles 116 which replaces the handles 60 as shown in FIG. 4. This basket is supported and mounted on inlet tube 58 but support projection 113 and stops 114 are provided at the rear of this strainer 54. As depicted, projections 113 rest upon and are positioned by support portions and stops 114 which are designed not only to support the projections 113 but also to limit the rearward movement of the basket. In order to lift the strainer 54 the handles 116 are grasped and the strainer basket lifted. Projections 113 are sufficiently short so that the basket can be slid back toward the wall 42d to allow the basket to be manipulated from the inlet tube 58.

TANDUM STRAINER EMBODIMENT AS SEEN IN FIGS. 18 AND 19

Figure 18:
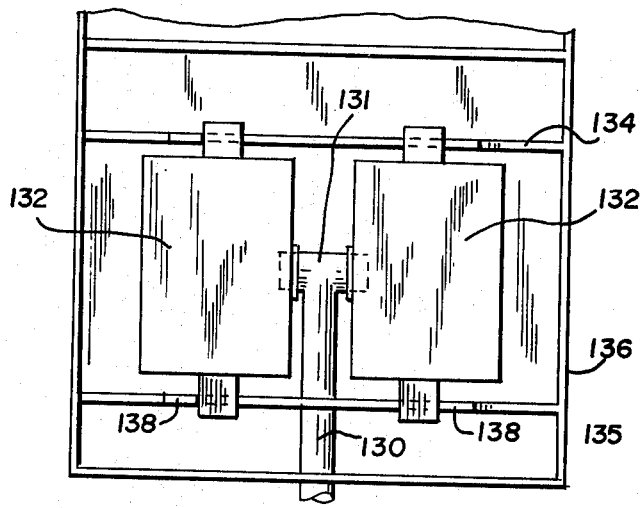
FIG. 18 represents a plan view for tandem use of strainer baskets.
Figure 19:
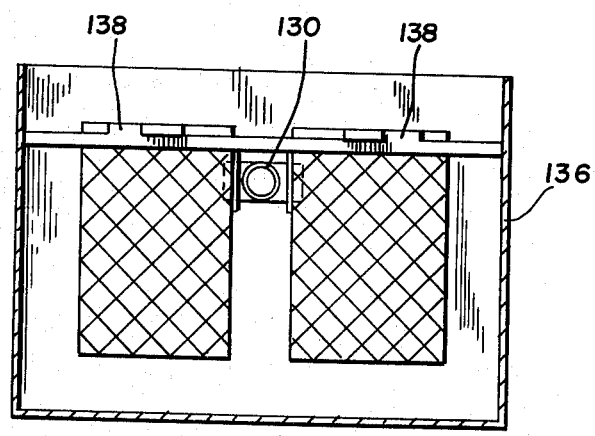
FIG. 19 represents a front view of the tandem arrangement of strainer baskets of FIG. 18.

As seen in FIGS. 18 and 19 an inlet 130 may be provided with a T-head connection 131. Like strainer baskets 132 are carried on rails 134 and 135 which extend from the side walls of the strainer container 136. In this arrangement the output from a dishwashing apparatus, which may have a particular heavy accumulation of material, is fed to two strainers 132. These strainers cna then be lifted for emptying and may be slid along the rail 134 and 135. Stops 138 are provided on the sliding rails 134 and 135 so that the positioned strainer is retained in the desired attitude against any thrust or flow. When it is desired to remove a strainer 132 from the container 136, said strainer is lifted over the stops 138 and moved backwardly to disengage the strainer from the T-head connection 131.

The tandem strainer of FIGS. 18 and 19 enable the output from a dishwashing apparatus to be efficiently handled. The larger flow may require strainer capacity that is greater than can be comfortably lifted from the strainer compartments. When the baskets and contents aggregate more than twenty-five to thirty pounds the tandem arrangement shown in preferred. The stops 138 prevent any unwanted sliding of the strainer baskets 132 along the rails 134 and 135. The pressurized flow from the dishwashing apparatus and the debris therewith thus cannot cause a dislodgement of the strainer basket 132 from the T-head portion 131.

EMBODIMENTS OF FIGS. 20 THROUGH 24

Referring next and finally to the embodiment as shown in FIGS. 20 through 24, it is to be noted that the grease and/or oil removal apparatus may be employed as a large volume operation in which plural containers are arranged to provide a flow sequence. For example, three rotating disks may be required but only one disk and one removable chute or conduit is placed in each compartment. In this embodiment the front container for the strainers is identified at 148 and there is provided a cover 150 having a front hinge portion 152. The discharge from a dishwashing apparatus is fed to a header identified as 155. From this header, pipes 156 are directed downwardly to valves 158 and thence through the cover 150 into strainer baskets 162.

Figure 22:
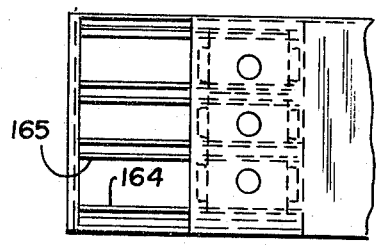
FIG. 22 represents a partly diagrammatic top or plan view and showing the arrangement of the strainer baskets of FIG. 20.
Figure 21:
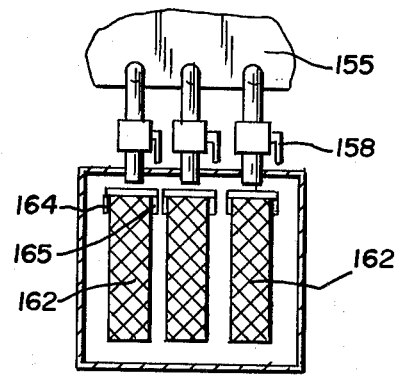
FIG. 21 represents a partly diagrammatic representation of the front view of the apparatus of FIG. 20.
Figure 23:
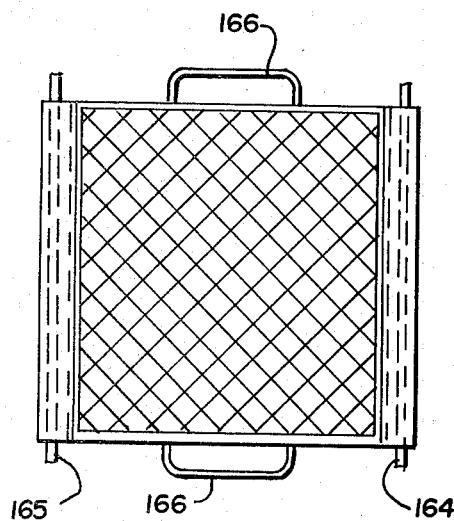
FIG. 23 represents, in an enlarged scale, a typical sliding basket as seen in a plan or top view.
Figure 24:
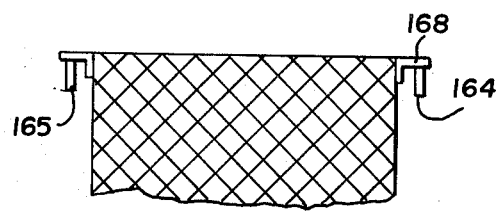
FIG. 24 represents a fragmentary end view of the strainer basket of FIG. 23, this view taken on the line 24—24 thereof and looking in the direction of the arrows.

As shown in particular in FIG. 22, each strainer basket 162 is sliable on like guide rods 164 and 165. As seen in particular in FIG. 21, the header 155 has three discharge pipes 156, each leading to a valve 158. Any one or all valves 158 may be closed to permit removal of one or more baskets 162 as they are slid to the right along the guide rods 164 or 165. When a valve 158 is closed, flow into the basket is, of course, stopped and this basket is then slid to its forward or left position whereat it is grasped by the handles 166 as seen in FIG. 23. Each basket is provided with angle iron portions 168 at the top edges which provide guiding sliding means for the movement of the strainers 162 in and out on guide rods 164 and 165.

In normal operation the outflow from the dishwasher apparatus is fed to the header 155 and from the header to and through pipes 156 to valves 158, pipes 160 and into the strainer basket 162. When it is desired to remove the accumulation in the strainer 162 the handle 166 of this strainer is grasped to pull said strainer to the left as in FIG. 22. With the front hinge portion 152 raised the strainer is then lifted and emptied of the large particles exiting from the dishwasher. As soon as the strainer basket 162 is emptied and cleaned it may be replaced in the strainer compartment 148 and into place beneath the discharge through pipes 160 after which the valve 158 is again opened to allow the contaminated water and residue to flow from the header and into the strainer. Wall 170 provides a baffle for the flowing into a compartment of the contaminated water passing through the slot 45 and into the first container.

Where there is a series of containers, each with a rotating disk, the baffle between the strainer compartment and the first container may have small slots therein to allow the flow of water through said wall as well as through the lower slot 45 below this wall. The baffle between the next to the last and the last compartment does not have any relief slots since it is a desire for the next to the last and the last rotating disk to remove substantially, if not all, of the grease and or/oil from the fluid so that the discharge effluent is substantially clean and pure at least as far as the presence of grease and/or oil.

In the larger containers it is contemplated that the disk 10 be carried by the appartus of FIGS. 13 and 14 and in the discharge in the pipe 160 after the valve 158 it is contemplated that the reducer of FIG. 15 may be used. Normally the fluid from the dishwasher is sufficiently hot to insure that the water, grease and/or oil in the several containers is sufficiently warm to insure that the grease and/or oil is sufficiently fluid to be collected and attracted to the rotating disk 10. Where it is desirable or necessary to have hot water added to the container to heat the grease and/or oil to a fluid condition the heater of FIGS. 10 and 11 may be used.

It is to be noted that the heating unit of FIGS. 10 and 11 is adapted to bring additional heated water from a source to pipe 74 and through the apertures 78 and thence as an inflow of pressurized fluid to and up the inclined planes of the angle 80. This manner of heating the contaminated water and the grease and/or oil in the container is easily accomplished without excessive turbulence or an overflow of the container in which the disk is mounted and rotated.

USE AND OPERATION

When the contaminated water leaves the dishwasher and/or the sink it often travels through a flow control (as in FIG. 15) and then a strainer before it enters the container 42. The purpose of the flow control is to slow the flow of water so there is more time for the grease and/or oil to rise. After the contaminated water leaves the flow control it enters the container 42 and, where provided, strikes the entrance baffle. The baffle on the separating wall diverts the greasy water to the bottom of the tank and under the baffle so the flow of water does not disturb the grease that is in the retention area. As the water enters the retention area, which contains the rotating disk 10, the grease and or/oil rises to the top. The grease and/or oil being lighter than water remains between the two baffles in the retention area. As the disk rotates, the grease and/or oil adheres to it and is wiped off into the discharge tube 41 and out into the container. The clean water now travels under the discharge baffle and out of the container 42 to either a sewer or septic system. A twenty four hour clock timer may control the operation of the apparatus. The timer may be set for at least a three hour cycle for removal of approximately two gallons of grease and/or oil. A four hour cycle is usually appropriate to collect about three gallons of grease in a twenty four hour period. It is recommended that the lid be removed from container 42 frequently to remove any floating debris that might clog the tube 41 or scraper blades 28.

The wall 42d between the strainer container and the grease and/or oil recovery unit when slots are provided in said wall have these slots formed at about the water line in the recovery container. As reduced to practice, these slots are about one-half inch by three inches long and there are only two slots in a wall. These slots allow the grease that may have accummulated in the strainer container to flow into a recovery container in which a rotating disk 10 is actuated. This flow of contaminated water from a dishwashing apparatus may have ceased but the disk 10 is still rotating. The slots may be used in recovery units of one or more containers 42.

As a method, the above apparatus provides for removing grease and/or oil in an essentially liquid condition from a contaminated fluid such as dishwater, which dishwater has grease and/or oil floating on or near its surface, said method including the steps of arranging a removal container having an open top and an influent passageway through a first end of the container so as to receive and retain this contaminated water, this container having an effluent passageway through a second end of the container; mounting and rotating a plastic surfaced disk on a rotating shaft and disposing said disk in an attitude so that said disk is substantially normal to the surface of the contaminating fluid and in the rotation of said disk dipping only the lower portion of this disk into the contaminated fluid whereat and whereby the grease and/or oil on the surface of the fluid in the container is attracted to the side areas of the rotating disk; arranging at least one baffle in this container and with this baffle disposed so as to inhibit the flow of any contaminated fluid over the top of the baffle, and while in position the baffle has an opening thereunder for the flow of clear water which exits from the effluent passageway of the container; mounting a readily removable bridge member on the container and positioning said bridge member so as to straddle the rotating disk when this disk is in a mounted condition; removably securing a pair of scraper blades of flexible plastic to this bridge member and with the scraper blades in position against the sides of the rotating disk bent to provide a bias sufficient to cause the edges of the engaged scraper blades to scrape the attracted grease and/or oil from the sides of the disk; turning the shaft and the mounted disk at a desired direction and speed and carrying the scrapings from the scraper blades by a conductor means to the exterior of the removal container.

Terms such as "up", "down", "bottom", "top", "front", "back", "in", "out" and the like are applicable to the depicted embodiment as shown and described in conjunction with the drawings. These terms are merely for the description of the grease and/or oil recovery apparatus as used and in particular to the scraper members as they are used or replaced.

Although the above disclosure is particularly directed toward removing grease and/or oil from the discharge of dishwashing apparatus, this apparatus may also be used to remove oil-like contaminants from liquids on which they float. The disk may be of solid plastic or of metal with a plastic coating and the scrapers are also of flexible plastic and are positioned so as to scrape the attracted oil and/or grease from the side of the rotated disk.

While particular scraper assemblies have been shown and described, it is to be understood that modifications may be made thereto and modifications made within the scope of the accompanying claims and protection is sought to the broadest extent the prior art allows.

What is claimed is:

1. A recovery apparatus adapted for removing grease and/or oil in an essentially liquid condition from a contaminated fluid such as dishwasher which dishwater has grease and/or oil floating on or near the surface, said apparatus including:

(a) a container having at least two compartments, said container having an influent passageway into an end in a first compartment which contains at least one strainer and an effluent passageway through an opposite end of a recovery compartment, said compartments having fluid conducting means leading from the strainer compartment to the recovery compartment;

(b) a strainer disposed in said strainer compartment, and a flow means for carrying an influent flow of contaminated fluid to this strainer, said strainer adapted to remove from the contaminated water flowing therethrough larger particles of food, cigarette butts and like debris which flows to the strainer and after straining said influent flow the contaminated water including grease and/or oil is fed to said recovery compartment;

(c) a rotating plastic disk mounted on a rotating shaft and disposed intermediate the end walls of the recovery compartment and disposed so that the disk is substantially normal to the surface of the contaminated fluid in said recovery compartment and as this disk is rotated it is partially immersed in the contaminated fluid with the grease and/or oil floating thereon and with said grease and/or oil being attracted to the sides of the disk sufficiently for the grease and/or oil to be lifted from the contaminated fluid by the rotating disk;

(d) at least one baffle carried in said recovery compartment, said baffle spaced from and adjacent a rear wall thereof and having a top edge normally above the fluid in the recovery compartment, this baffle disposed so as to inhibit the flow of any contaminated fluid over the top of the baffle while said baffle provides an opening thereunder for the flow of clear water after the removal of grease and/or oil, said clear water from said recovery compartment as the effluent flow;

(e) a readily removable bridge member carried in said recovery compartment and having a midportion formed with a cutout, this cutout positioned so that said cutout in the mounted bridge member straddles the disk as it is rotated, said bridge member in a mounted condition having its mounting midportion disposed in a substantially normal position to the surface of the fluid and removable from the disk by upward movement from the recovery compartment, the bridge member carried by support means within said compartment;

(f) a pair of scraper blades made of flexible plastic and mountable on the bridge member, each of said scraper blades when in engagement with the sides of the disk bent to provide a bias causing the disk engaging edges of said pair of blades to scrape the attracted grease and/or oil from the sides of the rotated disk after this disk emerges from the fluid and prior to the reentry of the rotated disk into the contaminated fluid, said scraper blades in mounted condition being substantially vertical and near the zenith of the disk, said scraper blades in a mounted condition adapted to engage the sides of the disk and to substantially equally restrain the rotating disk from unwanted movement;

(g) motive power means for rotating the disk at a desired speed and direction;

(h) means for removably securing the scraper blades to the bridge member so that the blades straddle the disk as it is rotated and when replacement is desired for repair said bridge member is removed from the second compartment, and (i) fluid conductor pipe adapted to receive the scrapings of grease and/or oil from a downward end of the blade and to retain the distal end of the scraper blade as it is curved into a scraping condition and to carry said scrapings by gravity to and through a wall of the recovery compartment.

2. Apparatus as in claim 1 in which the disk is of high density polyethylene and the shaft is rotated by a motor.

3. Apparatus as in claim 1 in which the scraper blades are of Nylon and are sufficiently flexible to be bent into arc-like configurations.

4. Apparatus as in claim 3 in which the Nylon scraper members are from one thirty-second to one sixteenth of an inch in thickness.

5. Apparatus as in claim 1 in which the bridge member is carried in U-shaped supports disposed within and attached to the side walls of the compartment containing the rotating disk.

6. Apparatus as in claim 5 in which there are two substantially alike U-shaped supports arranged as pairs, one of each bracket being carried and secured to opposite side walls of the second compartment.

7. Apparatus as in claim 1 in which the scraper blades are secured to the bridge member by bolts and a pair of retainer plates.

8. Apparatus as in claim 7 in which there is additionally provided a spacer block which is interposed between the bridge member and the scraper blades.

9. Apparatus as in claim 1 in which the strainer compartment is mde as an integral portion with the recovery compartment, the strainer removably carried within the strainer compartment with the strainer being self-supporting and having a removable cover mountable on said strainer compartment.

10. Apparatus as in claim 9 in which the influent fluid into the apparatus is connected to a tube secured to an outer wall of the strainer compartment with said tube having a short inward extension and a sized aperture formed in the wall of the strainer, the strainer being slid onto the inward extension of this tube to a stop limit so that the strainer does not engage any wall.

11. Apparatus as in claim 10 in which the strainer is removably mounted on an inwardly extending tube by the sliding of the strainer onto and off of the end of the extending tube.

12. Apparatus as in claim 9 in which the strainer is made from metal mesh.

13. Apparatus as in claim 9 in which the strainer is of mesh-like plastic.

14. Apparatus as in claim 9 in which the contaminated water delivered from the strainer first flows through the strainer thence to an outlet slot below the common wall between the containers.

15. Apparatus as in claim 1 in which there are plural filters disposed in the filter container, these filters adapted to receive the influent flow from the dishwashing apparatus and after filtering to feed the filtered fluid to at least one container having a rotating disk.

16. Apparatus as in claim 15 in which the plural filters are two in number with one filter arranged on each side of a T-headed inlet pipe.

17. Apparatus as in claim 16 in which the filters are carried on and are slidable on rail pairs, each rail pair having stop means to limit the rearward movement of the filter when supported by the rail pair and each filter is provided with cooperative means disposed to engage the stop means when the filter is in a selected position on the T-headed inlet pipe.

18. Apparatus as in claim 15 in which the flow from the dishwashing apparatus is fed to and through a manifold from which the fluid flow is delivered by plural and separate conduit means to the top of plural strainers, each strainer selectively removable from the strainer compartment to a position from which the strainer may be lifted for removal and cleaning.

19. Apparatus as in claim 18 in which there is also provided valve means in each conduit, each valve means selectively closed and opened with the valve means being opened when the flow is being strained and closed when the strainer is to be or is removed for cleaning.

20. Apparatus as in claim 1 in which auxiliary hot water is fed from an outside source to that container in which the disk is rotated, said hot water being fed to the container through a valve which is opened and closed in response to a selected temperature in said compartment, the motor rotating the disk being actuated only when a desired temperature in the compartment has been achieved.

21. Apparatus as in claim 20 in which the opening and closing valve is a solenoid valve and the temperature is determined by a thermostat having switch means which is actuated to provide a signal conductor to the solenoid valve when the temperature is lower than the selected level and the solenoid valve is closed by said switch means when the temperature is elevated at least to the selected level whereat the disk rotating motor is actuated.

22. Apparatus as in claim 21 in which a timer is also provided and this timer is adapted to actuate this apparatus and the rotating disk and the grease and/or oil recovery for only a selected period of time which can be repeated by reactivating the timer.

23. Apparatus as in claim 22 in which the auxiliary hot water is fed to the compartment through a pipe having a plurality of downwardly directed apertures when the pipe is in a mounted condition.

24. Apparatus as in claim 23 which further includes an upwardly directing deflector which receives the stream of hot water exiting from the apertures and directs said pressurized stream upwardly.

25. Apparatus as in claim 24 in which the auxiliary hot water is carried by apparatus which is affixed to the side wall of the container and by appropriate gasket means fluid is prevented from escaping the container.

26. Apparatus as in claim 1 in which each rotating disk is carried by a shaft carried by and in spaced-apart bearings, said bearings mounted in a support adapted to be secured to a side of a container, the shaft extending outside the container through an aperture formed in the sidewall of the container and a gasket seal is provided to prevent leaking of the fluid from the container, said support preventing undue bending, binding and deflection of the shaft carrying the rotating disk.

27. Apparatus as in claim 26 in which the support is a weldment and the inner bearing is disposed next to the rotating disk.

28. Apparatus as in claim 1 which includes directing the stream from the dishwashing apparatus to the strainer through a reducer that is disposed in a conduit and is adapted to reduce the volume of fluid flow by at least one-half.

29. Apparatus as in claim 1 in which the strainer basket is carried at its rear by contoured extending projections and each projection is removably carried by supporting stop portions secured to the separating wall between the strainer compartment and the separating compartment.

30. A method for removing grease and/or oil in an essentially liquid condition from a contaminated fluid such as dishwater, which dishwater has grease and/or oil floating on or near its surface, said method including the steps of:

(a) arranging a removal container having an open top and at least two compartments and providing said container with an influent passageway into an end in a first compartment which contains at least one strainer and an effluent passageway through an opposite end of a recovery compartment and providing said compartments with fluid conducting means leading from the strainer compartment to the recovery compartment;

(b) mounting a strainer in said strainer compartment, and a flow means for carrying an influent flow of contaminated fluid to this strainer, said strainer adapted to remove from the contaminated water flowing therethrough larger particles of food, cigarette butts and like debris which flows to the strainer and after straining, conducting said influent flow of contaminated water including grease and/or oil to said recovery compartment;

(c) mounting and rotating a plastic surfaces disk on a rotating shaft and disposing said disk in an attitude so that said disk is substantially normal to the surface of the contaminating fluid and in the rotation of said disk dipping only the lower portion of this disk into the contaminated fluid whereat and whereby the grease and/or oil on the surface of the fluid in the container is attracted to the side areas of the rotating disk;

(d) arranging at least one baffle in this container and with this baffle disposed so as to inhibit the flow of any contaminated fluid over the top of the baffle, and while in position the baffle has an opening thereunder for the flow of clear water which exits from the effluent passageway of the container;

(e) mounting a readily removable bridge member in said recovery compartment with said bridge member having a midportion formed with a cutout, this cutout positioned so that said cutout in the mounted bridge member straddles the disk as it is rotated, said bridge member in a mounted condition having its mounting midportion disposed in a substantially normal position to the surface of the fluid and removable from the disk by upward movement from the recovery compartment, the bridge member carried by support means within said compartment;

(f) removably securing a pair of scraper blades of flexible plastic to this bridge member and with each of said scraper blades, when in engagement with the sides of the disk, bent to provide a bias causing the disk engaging edges of said pair of blades to scrape the attracted grease and/or oil from the sides of the rotated disk after this disk emerges from the fluid and prior to reentry of the rotated disk into the contaminated fluid, said scraper blades in mounted condition being substantially vertical and near the zenith of the disk, said scraper blades in a mounted condition adapted to engage the sides of the disk and to substantially equally restrain the rotating disk from unwanted movement;

(g) turning the shaft and the mounted disk at a desired direction and speed;

(h) removably securing the scraper blades to the bridge member so that said blades straddle the disk as it is rotated and when replacement is desired for repair said bridge member is removed from the second compartment, and (i) carrying the scrapings from the scraper blades by a fluid conductor pipe adapted to receive the scrapings of grease and/or oil from a downward end of the blade and placing the distal end of the scraper blade as it is curved into a scraping condition in said pipe and to carry said scrapings by gravity to and through a wall of the recovery compartment.

31. A method for removing grease and/or oil as in claim 30 which includes making the disk of high density polyethylene and rotating the shaft by a motor.

32. A method for removing grease and/or oil as in claim 30 in which the scraper blades are of Nylon and are sufficiently flexible to be bent into arc-like configurations.

33. A method for removing grease and/or oil as in claim 32 in which the Nylon scraper members are from one thirty-second to one sixteenth of an inch in thickness.

34. A method for removing grease and/or oil as in claim 30 which includes supporting the bridge member in U-shaped supports disposed within and attached to the side walls of the compartment containing the rotating disk.

35. A method as in claim 30 which includes providing a strainer compartment as an integral portion with the recovery compartment, and removably carrying the strainer within the strainer compartment with the strainer being self-supporting and having a removable cover mountable on said strainer compartment.

36. A method as in claim 35 which further includes supporting the strainer on an inwardly extending tube by the sliding of the strainer onto and off of the end of the extending tube.

37. A method as in claim 35 in which the contaminated water delivered from the strainer first flows through the strainer thence to an outlet slot below the common wall between the strainer containers and recovery compartments.

38. A method as in claim 30 in which there are plural filters disposed in the filter container, said filters mounted so as to receive the influent flow from the dishwashing apparatus and after filtering to feed the filtered fluid to at least one container in which is disposed a rotating disk.

39. A method as in claim 38 in which the plural filters are two in number with one filter arranged on each side of a T-headed inlet pipe and carried on and are slidable on rail pairs and there is provided on each rail pair stop means for limiting the rearward movement of the filter when supported by the rail pair and providing each filter with cooperative means disposed to engage the stop means when the filter is in a selected position on the T-headed inlet pipe.

40. A method as in claim 38 which includes conducting the flow from the dishwashing apparatus to and through a manifold from which the fluid flow is delivered by plural and separate conduit means to the top of plural strainers and disposing each strainer so as to be selectively removable from the strainer compartment to a position from which the strainer may be lifted for removal and cleaning.

41. A method as in claim 40 which includes valve means in each conduit and with each valve means selectively closed and opened with the valve means being opened when the flow is being strained and closed when the strainer is to be or is removed for cleaning.

42. A method as in claim 30 which includes providing auxiliary hot water fed from an outside source to that container in which the disk is rotated, said hot water being fed to the container through a valve which is opened and closed in response to a selected temperature in said compartment and actuating the motor rotating the disk only when a desired temperature in the compartment has been achieved.

43. A method as in claim 42 in which the opening and closing valve is a solenoid valve and the temperature is determined by a thermostat having switch means which is actuated to provide a signal conductor to the solenoid valve when the temperature is lower than the selected level and the solenoid valve is closed by said switch means when the temperature is elevated at least to the selected level whereat the disk rotating motor is actuated.

44. A method as in claim 30 which includes carrying each rotating disk by a shaft carried by and in spaced-apart bearings and mounting said bearings in a support adapted to be secured to a side of a container, said supported shaft extending outside the container and through an aperture formed in the sidewall of the container and a gasket seal is provided to prevent leaking of the fluid from the container.

45. A method as in claim 30 which includes providing auxiliary hot water fed from an outside source to that container in which the disk is rotated, said hot water being fed to the container through a valve which is opened and closed in response to a selected temperature in said compartment, the motor rotating the disk being actuated only when a desired temperature in the compartment has been achieved.

46. A method as in claim 45 which includes providing a timer circuit, said timer circuit adapted to actuate this apparatus and the rotating disk and the grease and/or oil recovery for only a selected period of time which can be repeated by reactivating the timer.

47. A method as in claim 45 which includes feeding the auxiliary hot water to the compartment through a pipe having a plurality of downwardly directed apertures when the pipe is in a mounted condition.

48. A method as in claim 47 which further includes providing an upwardly directing deflector which receives the stream of hot water exiting from the apertures and directs said pressurized stream upwardly.

* * * * *